United States Patent
Stark

(10) Patent No.: US 6,603,907 B2
(45) Date of Patent: Aug. 5, 2003

(54) COMMUNICATIONS NETWORK AND METHOD OF INSTALLING THE SAME

(75) Inventor: Randolph Stark, New York, NY (US)

(73) Assignee: Neutron Media, LLC, New York, NY (US)

(*) Notice: Subject to any disclaimer, the term of this patent is extended or adjusted under 35 U.S.C. 154(b) by 0 days.

(21) Appl. No.: 09/809,910

(22) Filed: Mar. 16, 2001

(65) Prior Publication Data

US 2002/0131734 A1 Sep. 19, 2002

(51) Int. Cl.[7] .................................................. G02B 6/44
(52) U.S. Cl. ...................................... 385/100; 385/147
(58) Field of Search ........................ 385/100–114, 147; 405/183.5

(56) References Cited

U.S. PATENT DOCUMENTS

| | | | | |
|---|---|---|---|---|
| 4,647,251 A | * | 3/1987 | Gale ........................... | 405/154 |
| 4,757,258 A | * | 7/1988 | Kelly, Jr. et al. ........... | 324/220 |
| 6,089,546 A | * | 7/2000 | Griffioen et al. .......... | 254/134.4 |
| 6,259,523 B1 | * | 7/2001 | Welker .................... | 356/241.1 |

OTHER PUBLICATIONS

FastWeb si e aggiudicata, per un controvalore di 18,3 milliardi di lire, la gara d'appalto *per il cablaggio del cetro di Roma*, BISC.MI, Dec. 19, 2000. (Translation provided).

*Fastweb will cable the center of Rome*, Roma, Dec. 15, 2000.

Direzione Centrale Immobiliare Concessione in Uso Della Rete Di Posta *Pneumatica Di Roma*, Posteitaliane, Oct. 10, 2000. (Translation Provided).

*e.Biscom to lay fibre in Rome's Fascist-era tubes*, Rueters, Dec. 19, 2000.

* cited by examiner

Primary Examiner—Khiem Nguyen
(74) Attorney, Agent, or Firm—Davidson, Davidson & Kappel, LLC

(57) ABSTRACT

A method for inserting fiber optic cables in a pneumatic tube system is provided which comprises the steps of accessing a pneumatic tube network at at least two termination points and feeding a fiber optic cable through the pneumatic tube via the at least two termination points. The step of feeding may further comprise inserting a movable camera device at a first one of the at least two termination points; moving a guide cable from the first one of the at least two termination points through the pneumatic tube network to the second one of the at least two termination points; and pulling a fiber optic cable along the guide cable from the first one of the at least two termination points through the pneumatic tube network to the second one of the at least two termination points. The step of moving a guide cable may further includes inserting a movable camera device at one of the termination points and connecting a guide cable thereto; and moving the camera with the guide cable from the first one of the at least two termination points through the pneumatic tube network to the second one of the at least two termination points.

14 Claims, 5 Drawing Sheets

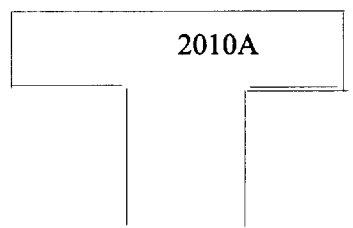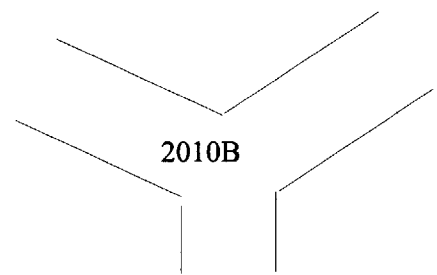
Fig. 2(b)
Figure 2c

COMMUNICATIONS NETWORK AND METHOD OF INSTALLING THE SAME

FIELD OF THE INVENTION

The present invention relates generally to the field of communications technology.

BACKGROUND OF THE INVENTION

Fiber optics is the science of transmitting data, voice, and images by the passage of light through thin, transparent fibers. In telecommunications, fibre optic technology has virtually replaced copper wire in long-distance telephone lines, and it is used to link computers within local area networks.

The basic medium of fiber optics is a hair-thin fiber that is sometimes made of plastic but most often of glass. A typical glass optical fiber has a diameter of 125 micrometers, or 0.125 mm (0.005 inch). This is actually the diameter of the cladding, or outer reflecting layer; the core, or inner transmitting cylinder, may have a diameter as small as 10 m. Through a process known as total internal reflection, light rays beamed into the fiber can propagate within the core for great distances with remarkably little attenuation, or reduction in intensity. The degree of attenuation over distance varies according to the wavelength of the light and to the composition of the fiber. When glass fibers of core/cladding design were introduced in the early 1950s, the presence of impurities restricted their employment to the short lengths sufficient for endoscopy. In 1966, electrical engineers K. C. Kao and G. A. Hockham, working in England, suggested using fibers for telecommunication, and within two decades silica glass fibers were being produced with sufficient purity that infrared light signals could travel through them for 100 km (60 miles) or more without having to be boosted by repeaters. Plastic fibers, usually made of polymethyl methacrylate, polystyrene, or polycarbonate, are cheaper to produce and more flexible than glass fibers, but their greater attenuation of light restricts their use to much shorter links within buildings or automobiles.

Optical telecommunication is usually conducted with infrared light. Infrared light is efficiently generated by light-emitting diodes or semiconductor lasers and suffers the least attenuation in glass fibers.

In 1898, the US Post Office Department began a large scale project, employing pneumatic tube systems to deliver mail in large urban areas. These tube systems used pressurized air to move a two foot by eight inch mail canister through an underground eight-inch cast iron pipe. This pneumatic system, known as The Twentieth Century Limited, was constructed to send priority and first-class mail between a city's central post office and connecting neighborhood post offices, avoiding road congestion and inclement weather. The pneumatic system was built in five cities (NYC, Boston, Philadelphia, Chicago and St. Louis); and construction was authorized in five others (Baltimore, Cincinnati, Kansas City, Pittsburgh and San Francisco). At its greatest expansion, there were over one-hundred and thirteen miles of mail tubes delivering as many as two-hundred thousand letters per tube every hour.

When the system was first installed, pneumatic transport was one of the greatest technological wonders available, and was commonly regarded, when combined with an effective railroad infrastructure, to be the greatest possible method for the delivery of mail and goods. Former Postmaster Robert Emory Smith, in 1900, predicted that one day every household would be linked to every other by means of pneumatic tubes. There were even several proposals around the turn of this century to build a tube system between North America and Europe. The tubes could carry a greater volume of messages than could be dispatched by the telegraph and were much faster than a horse-drawn wagon—at that time, the most common vehicle for mail delivery.

The pneumatic tube service continued in most cities until 1918. In New York City, the tube system remained in operation until Dec. 1, 1953, when it was suspended pending an internal review. The pneumatic system was discontinued permanently later that December when the Post Office terminated the contract for service. New York Mail and Newspaper Transportation Company, the owner of the pipes, was then ordered to remove the equipment from Post Office buildings. The tubes were abandoned to the City of New York in 1954 and were not subsequently used. In certain cities in Europe, the tubes were converted to accommodate telephone and telegraph wires.

Within Manhattan, the tube system ran for twenty-six miles, from the old Customs House by Battery Park to Harlem and back routing through Times Square, Grand Central Station and the main Post Office by Penn Station. Two eight-inch pipes were used along each route, one for sending the other for receiving. The pipes are completely airtight and are buried four to six feet underground; though in some places, the tubes are located within subway tunnels. The mail canisters were two feet long and just under eight inches in diameter in order to fit within the iron pipes. Each canister had a felt/leather packing on each end, to make an airtight seal, as well as four small wheels which helped prevent the canister from getting lodged at a junction in the pipes. The tubes are 8 and ⅛ inch internal diameter cast iron pipe, with a 9/16 inch wall.

SUMMARY OF THE INVENTION

In accordance with a first embodiment of the present invention, a method for inserting fiber optic cables in a pneumatic tube system is provided which comprises the steps of accessing a pneumatic tube network at at least two termination points and feeding a fiber optic cable through the pneumatic tube via the at least two termination points. In accordance with further aspects of this embodiment, the step of feeding further comprises inserting a movable camera device at a first one of the at least two termination points, moving a guide cable from the first one of the at least two termination points through the pneumatic tube network to the second one of the at least two termination points; and pulling a fiber optic cable along the guide cable from the first one of the at least two termination points through the pneumatic tube network to the second one of the at least two termination points. In accordance with still further aspects of this embodiment, the step of moving a guide cable further includes inserting a movable camera device at one of the termination points and connecting a guide cable thereto; and moving the camera with the guide cable from the first one of the at least two termination points through the pneumatic tube network to the second one of the at least two termination points. In this regard, the movable camera may be used to assess damage to the pneumatic tubes based upon images generated by the movable camera.

After installation of the fiber optic cables, maintenance on the fiber optic cables and the pneumatic tube network can be performed at any time by accessing the pneumatic tubes at at least two points, inserting a movable camera device at one of the points and connecting a guide cable thereto; moving the camera with the guide cable from the first one of the at least two points through the pneumatic tube network to the second one of the at least two points, and assessing damage to the pneumatic tubes and fiber optic cables based upon images generated by the movable camera.

In accordance with a second embodiment of the present invention, a method for inserting communications cables in a pre-existing tube system. In this regard, a pre-existing tube system is defined as a network of tubes which were previously installed underground for a purpose other than transmitting communications signals. In accordance with this embodiment, the method comprising the steps of: accessing a pre-existing tube network at at least two termination points, inserting a movable camera device at a first one of the at least two termination points, moving a guide cable from the first one of the at least two termination points through the tube network to the second one of the at least two termination points, and pulling a communications cable along the guide cable from the first one of the at least two termination points through the tube network to the second one of the at least two termination points. The communications cable can, for example, be a fiber optic cable, a copper cable, a co-axial cable, or any other cable conventionally used to communicate voice, data, and/or video signals. Similar to the first embodiment, the step of moving a guide cable may further include inserting a movable camera device at one of the termination points and connecting a guide cable thereto; and moving the camera with the guide cable from the first one of the at least two termination points through the pneumatic tube network to the second one of the at least two termination points in a In accordance with certain aspects of this embodiment, the pre-existing tube network is comprised of tubes having an interior diameter of between 8 and 9 inches. A non-limiting example of such a tube network is the pneumatic tube network described above in the background of the invention section.

In accordance with a third embodiment of the present invention, a communication system is provided which includes a pneumatic tube network; a plurality of terminals coupled to the pneumatic tube network via conduits; and one or more fiber optic cables disposed within the pneumatic tubes, at least one fiber optic cable connecting at least two of the plurality of terminals.

BRIEF DESCRIPTION OF THE DRAWINGS

FIG. 2(*b*) illustrates a T junction.

FIG. 2(*c*) illustrates a V junction.

DETAILED DESCRIPTION OF THE PREFERRED EMBODIMENTS

Figure 1A:
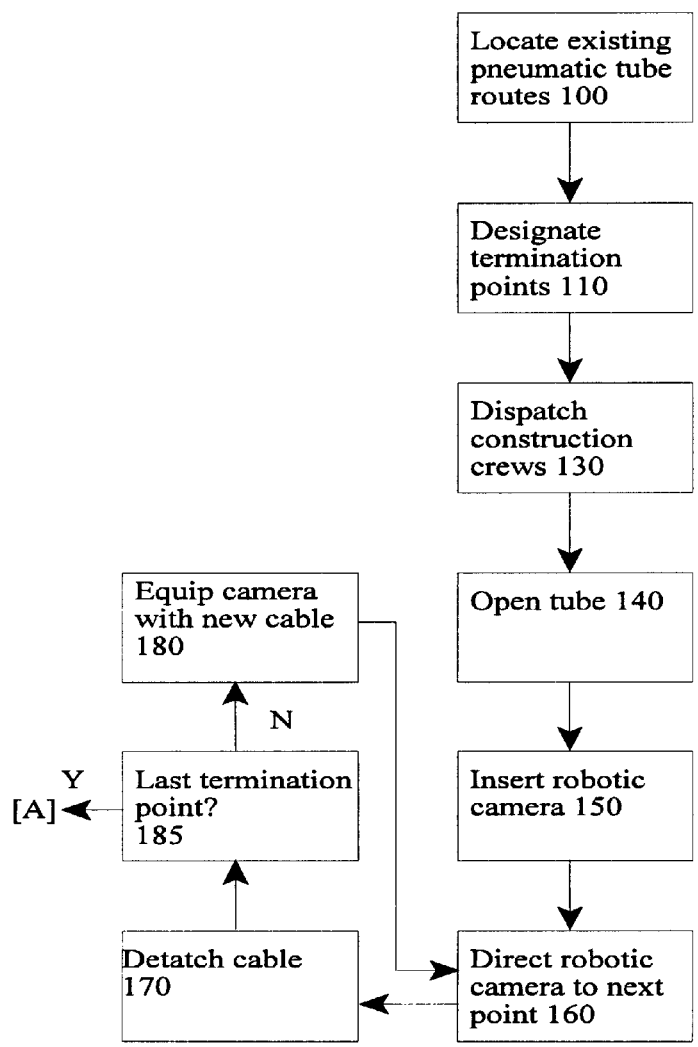
FIGS. 1(*a*) and 1(*b*) show a flow chart of a method for installing fiber optic cable in a pneumatic tube network.
Figure 1B:
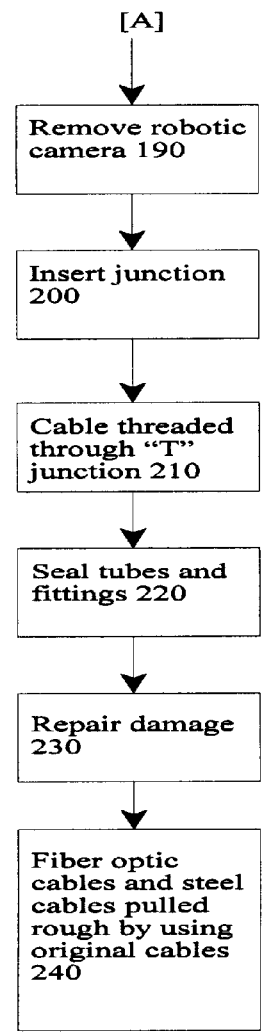

FIGS. 1(*a*) and 1(*b*) show a flow chart for a method for installing fiber optic cable in a pneumatic tube network. As described above, pneumatic tubes were installed in several U.S. cities in the late $19^{th}$ century to deliver mail. The tubes have an 8 ⅛ inch inner diameter and, when in use, were pressurized in order to transport mail. In order to install fiber optic cable in a pneumatic tube network, existing pneumatic tube routes must first be located (step 100). Once the tube routes are identified, points for bringing fiber optic cable into the pneumatic network (hereinafter "termination points") are selected (step 110). A number of factors may be taken into account when selecting the termination points. For example, it may be more difficult to gain access to a pneumatic tube in one location than another due, for example, to the location of geographic barriers (e.g., buildings, sewers, etc.), or the particular structural characteristics of the pneumatic pipe (e.g. the presence of a pneumatic pump or other structure). Similarly, it may be easier or more difficult to insert a connector (such as a T-junction) at certain locations in the pneumatic tube. Moreover, pneumatic tube sections located adjacent to larger groups of potential users of fiber optic cable may be more attractive as termination points. Similarly, the difficulty of pulling the fiber optic cable from a termination point into a building may also be considered.

In any event, once the termination points are located, the corresponding section of the pneumatic tube can be reached by digging down to the tubes in any conventional manner (such as with jack-hammers, back-hoes, and the like). Construction crews are dispatched to adjacent termination points along one line (i.e., a path exists between the adjacent termination points) of the pneumatic tubes (step 130). Each construction crew digs down to the pneumatic tube and cuts the tube open 140, using, for example, a blow torch, saw, or other appropriate instrument.

Once the pneumatic tube has been cut open, a robotic camera having a cable attached thereto is inserted into the tube (step 150). The camera is then directed through the tube to the adjacent termination point, which has already been opened by its crew (step 160). While traveling through the tube, the camera transmits the status of the inside of the tube to an operator, e.g., by a live video feed or through pictures, so that damage and deterioration to the tubes can be assessed. When the robotic camera reaches the subsequent termination point, the crew detaches the cable (step 170). If the robotic camera has not reached the last termination point (step 185), the construction crew equips the robotic camera with a new cable (step 180). The robotic camera is then directed to the next adjacent termination point (step 160). Examples of suitable robotic cameras include the Dacon Sewer Camera, Empire Industries' Sewer Rat or the Jet Buggy. The robotic camera can be controlled remotely, for example, in a wired or wireless fashion. In any event, the robotic camera should be designed in a manner which allows it to function in tubes with a 8 and ⅛ inch internal diameter. The cable, can, for example, be constructed of steel, and should be of sufficient strength to allow it to be retracted to retrieve the robotic camera from the tube in the event that the camera becomes disabled. If the robotic camera has reached a last termination point 185, the robotic camera is removed from the tube (step 190).

In any event, when a cable is detached from the robotic camera at a termination point, a junction pipe is mounted to the opening in the tube (step 200). The cable that the robotic camera has pulled to the termination point is then threaded through the junction and into a conduit. The conduit, in turn, provides a path into the fiber optic termination point (step 210) which, for example, may be in the basement of a building adjacent to the termination point of the pneumatic tube. In this manner, each fiber optic termination point (except the first and last in the case of a non-loop type network), will have at least two cables: one cable running from the fiber optic termination point to its associated junction and through to a subsequent pneumatic tube termination point, and one cable running from the fiber optic termination point to its associated junction and through to a prior pneumatic tube termination point. The conduits can, for example, be conventional conduits for holding fiber optic cables for telecommunications. Moreover, pre-existing conduits (e.g., conduits which were previously installed by a telephone carrier) may also be used to run cable from the junctions (or conduits associated therewith) into fiber optic termination points. It should be noted that not every cable which reaches a termination point needs to be threaded through the junction of the termination point. For example, if three successive termination points A through C are provided in a pneumatic network, it is possible for some cables originating from termination point A to be threaded through termination point B, while other cables originating from termination point A are threaded through termination point C.

After the cable has been threaded as described above, the pneumatic tube and its associated fittings (e.g. the junctions, conduits, and associated material) are sealed (step 220), and any damage caused to the surrounding area by gaining access to the tube (e.g., damage to roads, sidewalks, etc) is repaired (step 230) in an conventional manner. Preferably, this is done before the fiber optic cable is run through the pneumatic tube network in order to reduce the amount of time that the roads and sidewalks above the termination points need to be in disuse.

Fiber optic cable along with additional steel cables are then pulled through the tubes by using the original cables 240 (i.e., the cables that the robotic camera pulled through the pneumatic tubes.) The additional steel cables are pulled through in order that additional fiber optic cables may be passed through the tubes without having to re-open the tube. Thus, the fiber optic cables can be upgraded in a simple manner as new technologies develop. The fiber optic cable can be a loose tube cable, or a tight-buffered cable. Preferably, the fiber optic cable has a strength member, so that the cable will not be damaged as it is pulled through the pneumatic tubes. For example, a Kelvar strand or a fiberglass rod can be in the center of the cable. Moreover, the fiber optic cables can be of the simplex, zip cord, distribution, breakout, or loose tube cable type. The fibers in the fiber optic cable can be composed of step-index multi-mode fiber, graded-index multimode fiber, or single-mode fiber.

The material used to make the fibers of the optic cable can be Optical Glass, Fused Silica Fiber, low OH Fused Silica Fiber, Fluoride, Chalcogenide fiber, or any other material conventionally used in fiber optic cables for telecommunications applications. High quality optical glass transmits wavelengths from about 400 nm to about 900 nm, however, transmission in the UV range is very low and wavelengths below about 350 nm are not transmitted. When UV light is required, more expensive Fused Silica fibers can be used. At about 1.4 microns, all fibers except those specifically designed for IR transmission show a significant drop in transmission because of absorption in the glass. Low OH Fused Silica Fibers specifically designed for the NIR do not show the transmission drop at about 1.4 microns and transmit well between about 0.4 microns and about 2.5 microns. Fluoride and Chalcogenide Fibers can cover a range form about 1 micron to about 10 microns.

Once installed, the fiber optic cables are terminated to communications devices (including but not limited to router, bridges, and switches) in a conventional manner. These devices may, in turn, be coupled in a conventional manner to further communications devices such as computers and telephones. The computers could, for example, be computers operated by the end users of the voice, data, and/or video signals transmitted over the fiber optic cable, or could be telephone carrier computers which are used to facilitate communication of the signals to the end users (e.g., the customers of the telephone carrier).

The fiber optic cables may be used in a variety of communications systems. For example, the cables could be used for telephone communications networks, for WAN communications networks, or any other network which is capable of transmitting one or more of voice, data, and video signals. The communications network can be used in a variety of applications, including, for example, Remote Application Services, Real-time Network Applications, Remote Data Processing and Storage, Neural Network Processing, Encrypted Communications, Virtual Private Networks, Virtual Private Workspaces, Media on Demand, Multicast Video, Video Conferencing, Simulcast Conferencing, etc.

Figure 2A:
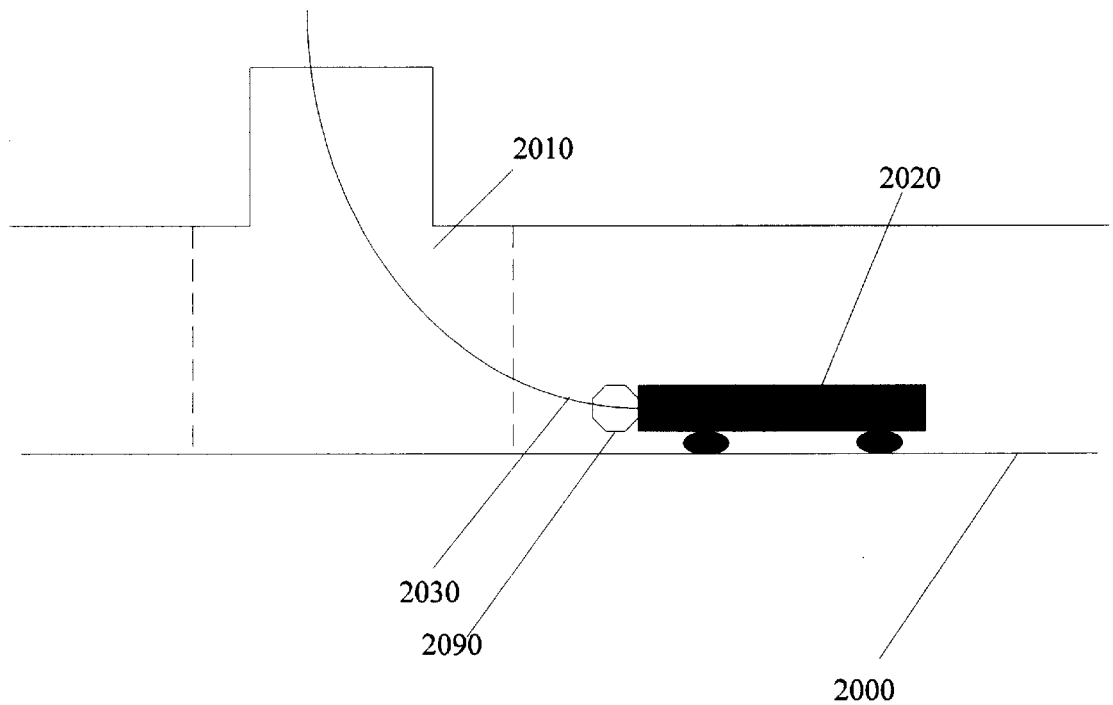
FIG. 2(*a*) illustrates a pneumatic tube after the construction crew has inserted a junction.

FIG. 2(*a*) illustrates a pneumatic tube 2000 after the construction crew has inserted a junction 2010. A robotic camera 2020 is also shown with the steel cable 2030 attached via a fastener 2090. The fastener 2090 can be of any conventional construction. Examples of suitable fasteners include swivel hooks, ball bearing couplings, flexible couplings, and universal joints. Attached to the robotic camera is a steel cable 2030. The junction 2010 could, for example, be a T-junction 2030A (FIG. 2(*b*)) or a V-junction 2030B (FIG. 2(*c*)). In general, the size and shape of the junction should be selected to conform with the flexibility of the fiber optic cable used. In other words, the junction 2010 should be of a sufficient size and shape to allow the fiber optic cable to be threaded there through without damage. The junction can for example be constructed of vitrified clay, hardened plastic, plastiline, PVC, or any other suitable material.

Figure 3:
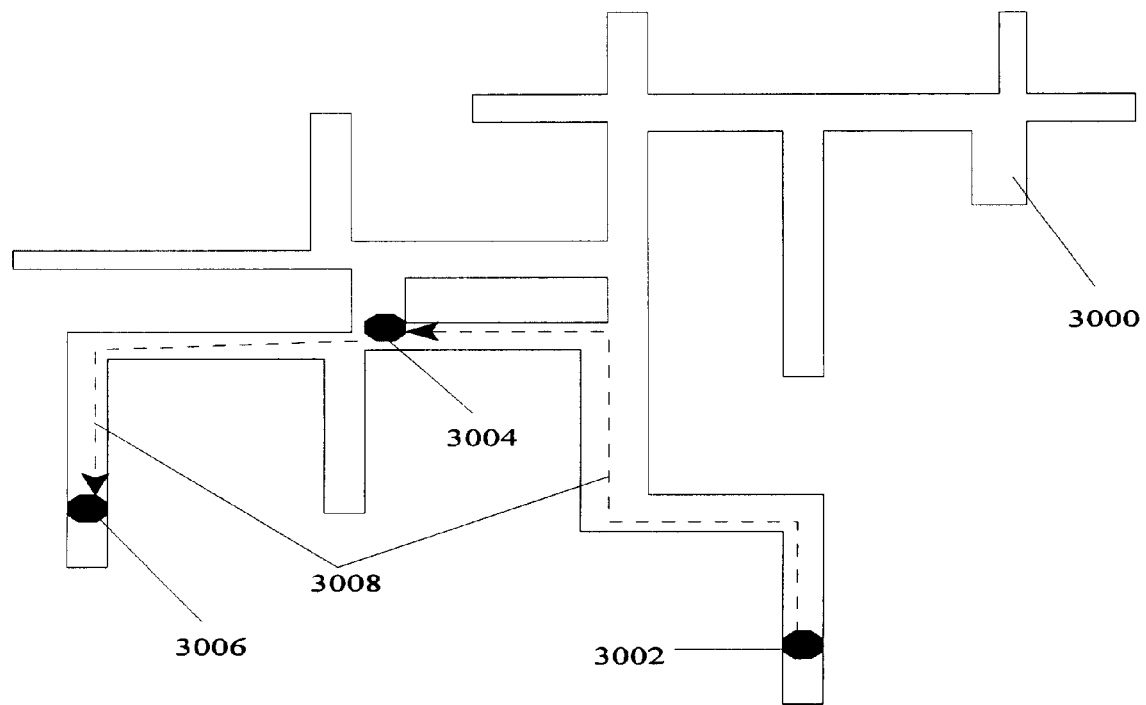
FIG. 3 illustrates a pneumatic tube system from an overhead perspective.

FIG. 3 illustrates a pneumatic tube system from an overhead perspective. Shown are the pneumatic tubes 3000 and a first, second, and third termination point 3002, 3004, 3006. The robotic camera follows a path 3008 from the first termination point 3002 to the second termination point 3004 and then from the second termination point 3004 to the third termination point 3006.

In the preceding specification, the invention has been described with reference to specific exemplary embodiments thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A method for inserting fiber optic cables in a pneumatic tube system comprising the steps of:

accessing a pneumatic tube network at at least two termination points;

feeding a guide cable through the pneumatic tube via the at least two termination points;

attaching a fiber optic cable to the guide cable; and pulling the fiber optic cable through the pneumatic tube with the guide cable.

2. The method of claim 1, wherein the step of feeding further comprises inserting a movable camera device at a first one of the at least two termination points; and moving the guide cable from the first one of the at least two termination points through the pneumatic tube network to the second one of the at least two termination points.

pulling a fiber optic cable along the guide cable from the first one of the at least two termination points through the pneumatic tube network to the second one of the at least two termination points.

3. The method of claim 2, wherein the step of moving a guide cable further includes inserting a movable camera device at one of the termination points and connecting a guide cable thereto; and moving the camera with the guide cable from the first one of the at least two termination points through the pneumatic tube network to the second one of the at least two termination points.

4. The method of claim 3, wherein the moving step further comprises assessing damage to the pneumatic tubes based upon images generated by the movable camera.

5. A method for inserting communications cables comprising the steps of:

accessing a pre-existing pneumatic tube network at at least two termination points;

inserting a movable camera device at a first one of the at least two termination points;

moving a guide cable from the first one of the at least two termination points through the tube network to the second one of the at least two termination points by pulling the guide cable with the movable camera device;

pulling a fiber optic cable along the guide cable from the first one of the at least two termination points through the pneumatic tube network to the second one of the at least two termination points.

6. The method of claim 5, wherein the pre-existing tube network is comprised of tubes having an interior diameter of between 8 and 9 inches.

7. The method of claim 5, wherein the step of moving a guide cable further includes inserting a movable camera device at one of the termination points and connecting a guide cable thereto; and moving the camera with the guide cable from the first one of the at least two termination points through the pneumatic tube network to the second one of the at least two termination points.

8. The method of claim 7, wherein the moving step further comprises assessing damage to the pneumatic tubes based upon images generated by the movable camera.

9. The method of claim 1, further comprising the step of performing maintenance of the communications cables and the pneumatic tube network by:

accessing the pre-existing tube network at at least two points inserting a movable camera device at one of the points and connecting a maintenance guide cable thereto;

moving the camera with the maintenance guide cable from a first one of the at least two points through the pneumatic tube network to a second one of the at least two points; and assessing damage to the pneumatic tubes and fiber optic cables based upon images generated by the movable camera.

10. The method of claim 5, further comprising the step of performing maintenance of the communications cables and the pneumatic tube network by:

re-accessing the pre-existing pneumatic tube network at at least two termination points inserting a movable camera device at one of the termination points and connecting a guide cable thereto;

moving the camera with the guide cable from a first one of the at least two termination points through the pneumatic tube network to a second one of the at least two termination points; and assessing damage to the pneumatic tubes and fiber optic cables based upon images generated by the movable camera.

11. The method of claim 1, further comprising the step of terminating the fiber optic cable at a communications device.

12. The method of claim 5, further comprising the step of terminating the fiber optic cable at a communications device.

13. The method of claim 1, further comprising, prior to the feeding step, repositioning one or more tubes in the pneumatic tube network.

14. The method of claim 5, further comprising, prior to the inserting step, repositioning one or more tubes in the pneumatic tube network.

* * * * *